United States Patent [19]

Gierhart

[11] 4,308,943
[45] Jan. 5, 1982

[54] LIQUOR FLASK ORIENTER

[75] Inventor: Harry D. Gierhart, Lancaster, Ohio

[73] Assignee: Anchor Hocking Corporation, Lancaster, Ohio

[21] Appl. No.: 140,116

[22] Filed: Apr. 14, 1980

[51] Int. Cl.³ .............................................. B65G 47/24
[52] U.S. Cl. .................................. 198/399; 198/416; 193/44
[58] Field of Search ...................... 198/394, 399, 416; 193/44, 45, 47

[56] References Cited

U.S. PATENT DOCUMENTS 2,664,816  1/1954  Gibson ................................ 198/416
3,216,551 11/1965  Peck .................................... 198/399
3,726,387  4/1973  Krooss ................................ 198/416

FOREIGN PATENT DOCUMENTS 903524  2/1954  Fed. Rep. of Germany ...... 198/399

Primary Examiner—Joseph E. Valenza

Attorney, Agent, or Firm—Wood, Herron & Evans

[57] ABSTRACT

Means for orienting containers of the type having a concave face, such as glass liquor flasks, while they are being conveyed, so that their concave faces are all toward a selected direction. As they are being conveyed the containers are biased against a specially contoured surface on a fixed shoe along which they slide. A container whose concave face is already facing the shoe slides along the contoured shoe surface without being turned or reoriented; but a misoriented container, whose concave face is reversed to the shoe, is turned by the special shape of the shoe surface to a crosswise position on the conveyor. The containers turned crosswise (but only those containers) are then further rotated to the desired orientation, the reverse of their original orientation, by conveying them past a brake which engages endwise surfaces of the crosswise containers and which slows or arrests that portion of such containers as the movement of the conveyor turns them toward the desired orientation.

16 Claims, 3 Drawing Figures

U.S. Patent     Jan. 5, 1982     4,308,943
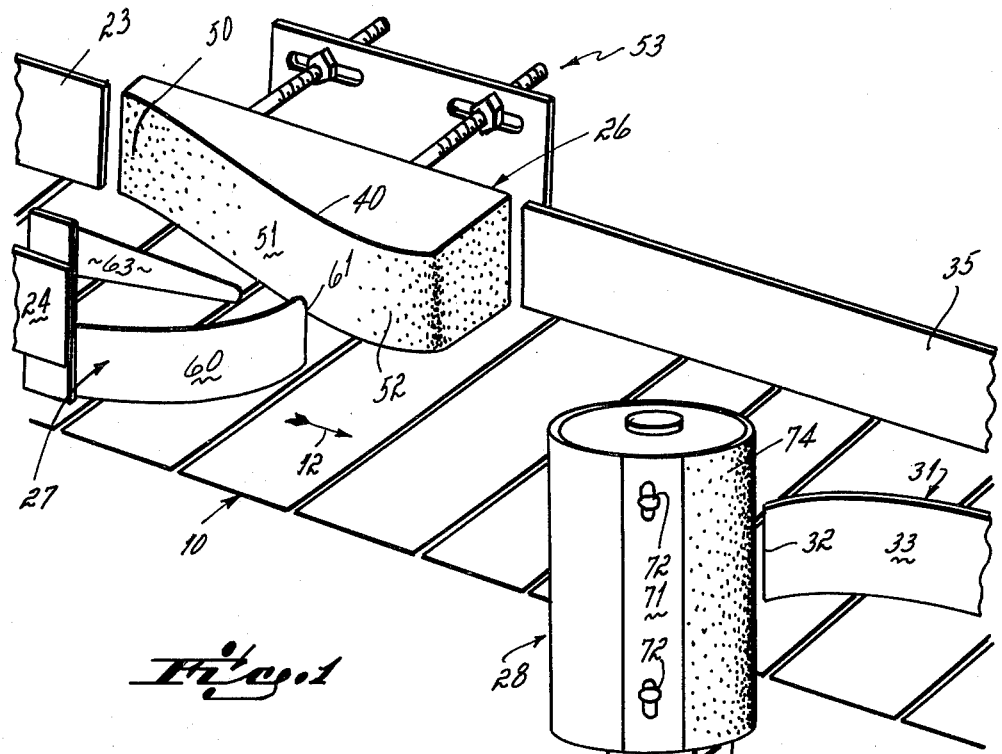
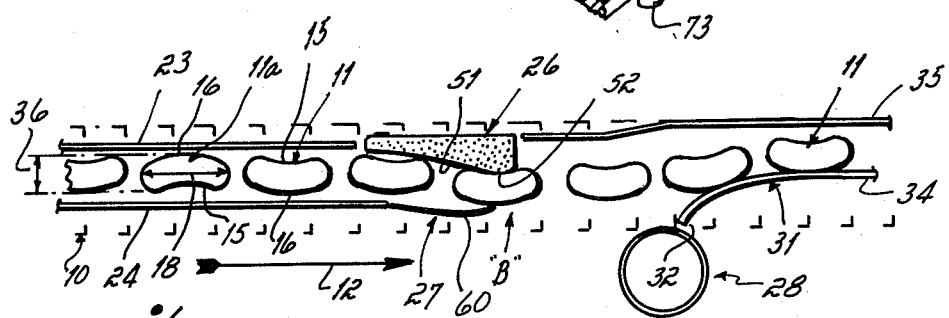
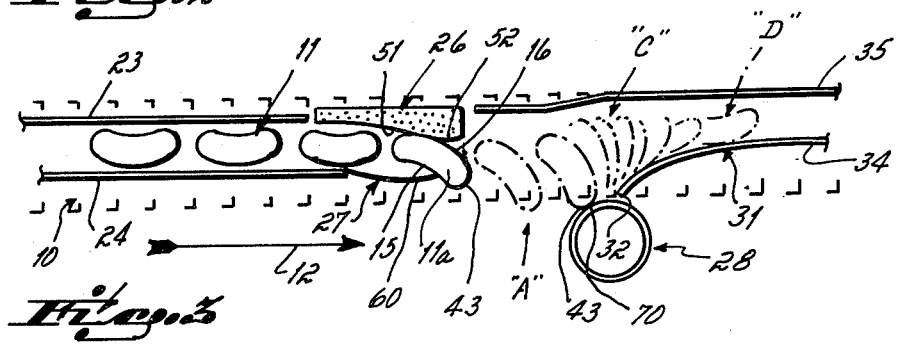

LIQUOR FLASK ORIENTER

This invention relates to means for uniformly orienting concave-faced glass containers such as liquor flasks, as they are moving on a conveyor.

At certain stages during the manufacture, labeling, fillng, testing and/or packing of glass containers which are not axially symmetric, it is important that each container be oriented about its vertical axis in the same direction as the others. The containers are, of course, uniformly oriented when they are molded, but orientation thereafter changes, for example as they move from a multi-row lehr belt onto a single line conveyor. Uniform orientation must be re-established if, for example, labels are to be applied automatically, or for the containers to be loaded by an automatic casepacker.

Various types of orienting devices are already known in the art. An example of one such device, based on a photoelectric detection system, is shown in Sollenberger et al U.S. Pat. No. 4,149,621, issued Apr. 17, 1979, which is assigned to the assignee of this application.

There has been a need for a simple, inexpensive and reliable device for detecting misoriented containers as the containers are being conveyed, and orienting them to a desired direction. It has been the objective of this invention to provide an orienter which will function without electronic sensors, without moving parts other than a spring arm, and which is adjustable for use with containers of different sizes and shapes.

The container orienter of this invention is especially useful for orienting liquor flasks, which have one concave face and an opposite convex face. It is desirably used in association with a single line container conveyor which may be of known type, whereon the containers stand with their greater horizontal dimension parallel to the direction of conveyor movement. The orienter comprises the combination of a shoe, a spring or biasing arm, and a stationary brake. The biasing arm gently presses each container against the shoe as the containers are being conveyed in spaced apart, single row relation. The shoe presents a specially contoured wall or surface along which the container face slides as the container is being conveyed and which partially rotates the misoriented containers (but not the properly oriented containers) by turning them crosswise with respect to the direction of travel. The brake, which is downstream of the shoe and the biasing arm, is positioned so that it engages the edges of the crosswise containers and slows their travel so that the movement of the conveyor causes the crosswise containers to rotate about the brake, to more nearly complete the reversal of the original orientation. A guide rail is desirable to help complete the reversal of original orientation of the misoriented containers.

As viewed in horizontal section, the shoe surface which engages the containers has a "pear" or bulbous shape. This contour has been found empirically to be effective to rotate a container if the container surface opposite from the concave side thereof is pressed against the shoe surface as the container is conveyed along, and not to rotate a container whose concave side engages the shoe. The shoe surface has a low coefficient of friction to glass, so that the container slides easily along the shoe surface as the conveyor carries it forward, while the biasing arm lightly presses the container into contact with the shoe surface. At its upstream end (with reference to the direction of conveyor movement) the shoe surface is spaced furthest from the centerline of the conveyor. Continuing in the direction downstream from the leading end, the shoe surface presents a concave ramp which extends progressively further into the path of container movement. Downstream of the ramp is a convex rounded apex surface having a curvature which preferably is slightly less than the radius of curvature of the concave side of the container.

As noted, a shoe surface of this shape interacts differently with differently oriented containers as they are carried past it, depending upon which side of the container engages the shoe. The shoe will turn crosswise containers having a convex side in engagement with the shoe surface, but it does not turn those containers whose concave side is oriented toward the shoe. Thus the orientation of those containers whose concave face engages the shoe surface is not substantially disturbed as they move past; but containers having a convex face engaging the shoe are turned, in a rolling motion, as the biasing arm presses them against the shoe. The extent of the turning movement so effected depends on shoe curvature, bottle shape, and other facts; but it can be roughly 60°. This puts such containers in a crosswise position, and in that position an outer edge of the container contacts and drags across the brake as the container continues to be conveyed downstream. The brake, or drag element, engages such crosswise containers at their edge, but does not engage those containers whose concave surface was toward the shoe. As the brake exerts a drag on the partially reoriented crosswise containers, it further turns them about their axes until their concave surfaces have been turned more than 90° from original orientation, and are more nearly toward the side of the conveyor on which the shoe is located. Desirably, a guide rail is mounted downstream of the brake to center and/or complete reorientation of the containers.

The apparatus includes no moving parts, apart from the resilient bending of the biasing arm. It is not necessary that the brake move or rotate; its frictional drag is sufficient to turn the container without rotation or movement of its own.

A given shoe shape may be used for several different types of container sizes and shapes by adjusting the lateral and/or longitudinal position of the shoe with respect to the path of the containers on the conveyor.

In tests the device has been found to operate with high reliability and for a long period of time without requiring mechanical adjustment. The shoe is preferably made of a material, for example a phenolic laminate, which displays a low coefficient of drag on the glass container so that the surface wears only at a very slow rate. The brake surface which interacts frictionally with the containers is subjected to a higher rate of wear, and for that purpose it is desirable to provide for replacement of the frictional surface, as for example by providing it as an indexable spool having a replaceable silicon sponge rubber cylindrical outer surface.

The invention can best be described and further explained by reference to the accompanying drawings, in which:

FIG. 1 is a perspective view, somewhat diagrammatic in nature, of orienting apparatus in accordance with a preferred embodiment of the invention;

FIG. 2 is a diagrammatic plan view of the apparatus of FIG. 1, and shows a single line of flasks being conveyed through the apparatus, the majority of the flasks having their concave faces oriented toward the shoe;

FIG. 3 is a diagrammatic plan view similar to FIG. 2 but shows the path of motion of a flask fed to the apparatus with its convex face toward the shoe.

DETAILED DESCRIPTION

In the drawings, a conveyor 10, which may be of known type, moves containers each designated by 11, in a direction of movement indicated by the arrow 12. Parallel longitudinal guides or rails 23, 24 are desirable to center or align the containers longitudinally before they are conveyed to the orienting apparatus. The containers 11 shown for purposes of illustration are conventional concave-convex 200 ml. liquor flasks. Each flask presents on one side a concave face 15 and on the opposite side a convex face 16.

The containers are conveyed in a single line, with their longer dimension (designated by 18 in FIG. 2) generally parallel to the direction of conveyor movement 12. The orientation of the containers is not uniform; the concave side 15 of a given container may face either side of the conveyor. For example, the concave side 15 of the flask designated at 11a in FIG. 2 faces one way (toward the bottom of the drawing), while the other containers in FIG. 2 are oppositely oriented, with their concave sidewalls 15 facing in the opposite direction (upwardly in the drawing). If, say, the latter orientation is needed for some downstream operation such as case packing, then container 11a can be said to be misoriented. To bring a misoriented flask into proper orientation, it must be rotated 180° about its vertical axis. It is the function of the orienting apparatus of this invention to detect such misorientation and to turn the misoriented containers to the desired orientation.

In broad form, the orienting apparatus comprises three elements: a container engaging shoe 26 which is positioned adjacent one side of the conveyor; a biasing arm 27 positioned on the opposite side of conveyor 10 across from shoe 26; and a brake or frictional surface element 28 which engages and slows the movement past it of an edge of any container which engages it, so as to cause the container to turn about its axis (see FIG. 3). Brake 28 is positioned downstream of shoe 26 and biasing arm 27, and is located in the opposite side of the conveyor from the shoe. It is preferably but not necessarily in the form of a "spool" or cylinder. It is desirable, but not always necessary, also to provide a curved rail 31 extending downstream from frictional surface 28.

Shoe 26 has a specially contoured front surface, designated generally by 40, which faces toward the centerline of the conveyor and along which the containers slide as they are carried past it. The shape of this surface exerts a turning force on those containers which have their convex surface 16 oriented toward it (for example the container at 11a in FIG. 3) and causes such containers to be turned from their original orientation (which was parallel to the direction of conveyor movement 12) until they are in a generally "transverse" or "crosswise" position as designated at "A" in FIG. 3. Thereafter, as the crosswise container at "A" passes brake 28, one side 43 of the container engages the brake. Thr frictional torque on the flask side causes the flask to be turned still further toward the reverse orientation (see the path of motion shown at "C" in FIG. 3). As to those "properly oriented" containers which were infed with their concave faces 15 toward shoe 11, the shoe does not turn them and they slide along and curl around it without being substantially rotated about their vertical axes (see the container at "B" in FIG. 2).

More specifically, sidewall 40 of shoe 26 has a shape (as viewed in plan or in horizontal section) which might be described as a "pear-shape," i.e., it has the shape of half a pear, seen in cross section. The surface 40 extends from a leading or upstream surface portion 50 which may be at essentially the same distance from the conveyor centerline as the upstream guide rail 23. Downstream of the upstream surface portion 50, shoe 26 presents a ramp portion 51 which is preferably slightly concave (see FIGS. 2 and 3) and which progressively approaches the centerline of conveyor 10. Further in the downstream direction ramp 51 merges into a convexly rounded surface having an apex 52 which most closely approaches the centerline of the conveyor. Downstream of the apex, the shoe surface 40 curves away or recedes from the conveyor centerline. The radius of convex curvature at apex 52 is slightly less than the radius of curvature of container concave surface 15, so the container concave surface 15 "rolls" around the shoe apex in moving past.

To assist in set-up and to enable the position of the shoe to be adjusted to best fit containers of different sizes and shapes, the shoe is desirably adjustably positionable with respect to the conveyor. For this purpose adjustable mounting means 53 are preferably provided, for example in the form of bolt and slot adjustment means as shown in FIG. 1, whereby the shoe can be shifted in the longitudinal direction of conveyor movement and/or in the lateral or transverse direction.

Biasing arm 27, which is mounted opposite shoe surface 40 on the other side of the conveyor, is best shown in FIG. 1. It includes an inwardly curved leaf spring finger 60 which in normal position projects toward the rounded apex 52 of the shoe, and has a tip 61 which is spaced from the shoe apex 52 by a dimension less than the width of the containers, so that it guides and lightly presses each container against the shoe surface. To stabilize the motion of the containers and to prevent tip over, it is desirable to provide a stabilizer finger 63, see FIG. 1, above the finger 60.

The brake or frictional surface 28 is preferably in the form of a spool 28 having a rounded or cylindrical surface 70 which will be engaged by those containers that have been turned crosswise to position "A." Surface 70 exerts a drag on the passage of the side wall 43 of a crosswise container, thereby causing the container to further rotate (phantom lines at "C" in FIG. 3) as it passes the brake. The spool does not itself rotate, although it may do so (e.g., in the coutnerclockwise direction). The spool preferably comprises a cylinder having a vertical axis, and it has wrapped or clamped around its outer surface a sheet of resilient material 74 which has a high coefficient of friction for glass such as a sponge rubber. Silicon sponge rubber is desirable in applications where the glassware is hot. The sheet of material 74 is clamped to the spool surface by a mounting strip 71 which is secured by screws 72 to the spool. It is desirable, although not necessary, that the spool be mounted on a shaft 73, by means which can be loosened to permit the spool to be rotated or incremented rotationally a few degrees from time to time, to present fresh surface portions thereof to engage the container edges. As the glass wears the drag surface 70, the axle nut 75 can be loosened to permit the spool to be turned to present a fresh or unworn surface area to engage the crosswise containers "A." Spool 28 is desirably mounted on a slotted track 76 so that its position with respect to the centerline of the conveyor can be changed, to properly engage the crosswise container at "A."

The orienting rail 31 guides and completes the rotation of the originally misoriented containers, from position "C" to the desired orientation. The rail has an upstream end adjacent the apex of the spool 28, and has a curved or rounded ramp portion 33 which leads from upstream end 32 to a straight portion 34, parallel to the direction of conveyor movement 12. It is also desirable to provide an opposite side rail 35 extending downstream from shoe 26. The straight portion 34 of rail 31 is spaced from the opposite side rail 35 by an amount greater than width 36 of a container (FIG. 2) but less than the longitudinal dimension 18, so that the container is guided into an orientation with its longitudinal axis parallel to the direction of conveyor movement. Those containers which were already oriented with their concave side 15 toward the shoe are not turned by the shoe, and are carried between the rails 31 and 35. At position "D" all containers thus are in the same orientation, with their concave surfaces toward rail 35.

Having described the invention, what is claimed is:

1. Apparatus for orienting concave-sided glass containers such as flasks, as they are being conveyed on a conveyor, to position all of the concave sides thereof in the same orientation, said apparatus comprising
   a shoe mounted adjacent the path of the containers on the conveyor, said shoe having a face including a ramp portion which extends progressively into the path of the containers as they move downstream, the ramp portion merging into a convexly curved apex portion, said apex portion extending furthest into the path of movement of the containers,
   a biasing arm projecting into the path of container movement from the side of the conveyor opposite the shoe, the biasing arm positioned to urge each container against the shoe face as the container is carried therepast,
   the shoe thereby acting on containers whose concave side is away from the shoe to cause such containers to turn into a crosswise position on the conveyor, but not to turn containers whose concave side is toward the shoe, and
   a brake downstream of the arm and shoe and positioned to engage only those containers which have been turned to a crosswise position, said brake exerting a torque on such crosswise containers and thereby causing them to be rotated, by motion of the conveyor, from said crosswise position to a position in which the concave faces thereof are more nearly toward the shoe side of the conveyor than toward the opposite side thereof.

2. The apparatus of claim 1 wherein the shoe face has a pear-shape cross-sectional configuration.

3. The apparatus of claim 1 wherein the apex portion of said shoe face has a radius of curvature less than that of the concave side of said containers.

4. The apparatus of claim 1 wherein the ramp portion of said shoe face has a concave curvature, said concave curvature leading to the convex apex portion of the shoe face.

5. The apparatus of claim 4 wherein said biasing arm is positioned to press the container into the concavity of the ramp.

6. The apparatus of claim 1 wherein said shoe face is formed of a material which exerts a low coefficient of friction on the containers.

7. The apparatus of claim 1 wherein said biasing arm comprises a leaf spring finger.

8. The apparatus of claim 7 wherein said spring finger curves toward the shoe face.

9. The apparatus of claim 1 wherein said brake presents a surface which exerts a frictional drag on the containers which engage it.

10. The apparatus of claim 9 wherein said brake has a surface of sponge rubber.

11. The apparatus of claim 1 wherein said brake comprises a cylinder having a vertical axis.

12. The apparatus of claim 11 wherein said cylinder is wrapped with a sheet of rubber which exerts a frictional drag on containers which engage it.

13. The apparatus of claim 11 wherein said cylinder is indexable to present different portions of the surface thereof to said containers as said surface is subjected to wear.

14. The apparatus of claim 1 further including means mounting said shoe whereby said shoe is adjustably positionable in the direction transverse to the direction of conveyor movement.

15. The apparatus of claim 1 including means mounting said shoe whereby the said shoe is adjustably positionable in the direction of conveyor movement.

16. The apparatus of claim 1 further including means mounting said brake whereby said brake is adjustably positionable in the direction transverse to the direction of conveyor movement.

* * * * *